(12) United States Patent  
Wilder et al.

(10) Patent No.: US 8,623,206 B2  
(45) Date of Patent: Jan. 7, 2014

(54) GRAVITATIONAL FILTER AND LIQUID PURIFICATION DEVICE

(75) Inventors: Haim Wilder, Raanana (IL); Abraham J. Domb, Efrat (IL)

(73) Assignee: Strauss Water Ltd, Petach Tikva (IL)

( * ) Notice: Subject to any disclaimer, the term of this patent is extended or adjusted under 35 U.S.C. 154(b) by 758 days.

(21) Appl. No.: 12/310,626

(22) PCT Filed: Aug. 28, 2007

(86) PCT No.: PCT/IL2007/001066  
§ 371 (c)(1),  
(2), (4) Date: Jun. 1, 2010

(87) PCT Pub. No.: WO2008/026208  
PCT Pub. Date: Mar. 6, 2008

(65) Prior Publication Data  
US 2010/0243550 A1   Sep. 30, 2010

Related U.S. Application Data

(60) Provisional application No. 60/823,664, filed on Aug. 28, 2006, provisional application No. 60/929,668, filed on Jul. 9, 2007.

(51) Int. Cl.  
*B01D 24/00* (2006.01)

(52) U.S. Cl.  
USPC ............ 210/207; 210/241; 210/265; 210/282; 210/286; 210/291; 210/484; 210/521

(58) Field of Classification Search  
USPC ......... 210/663, 669, 764, 807, 199, 202, 203, 210/205, 206, 207, 241, 265, 282, 285, 286, 210/291, 301, 315, 342, 521, 484, 486  
See application file for complete search history.

(56) References Cited

U.S. PATENT DOCUMENTS

| 789,968 A | 5/1905 | Ernst |
| 1,090,283 A | 3/1914 | Crandall |

(Continued)

FOREIGN PATENT DOCUMENTS

| DE | 38 28 008 A1 | 3/1990 |
| GB | 2 196 329 A | 4/1988 |

(Continued)

*Primary Examiner* — Lucas Stelling  
(74) *Attorney, Agent, or Firm* — Nath, Goldberg & Meyer; Jerald L. Meyer; Lakshmi Rajan

(57) ABSTRACT

A system, that may be portable, for purifying liquid flowing gravitationally from a source/reservoir into a purified liquid receptacle is described. The system includes a housing with a generally horizontal filtering space. More than one liquid inlet disposed at a top portion of the filter is provided as well as one or more liquid outlets disposed at a bottom portion. The liquid flows in a generally lateral direction through the liquid treatment medium. Two or more first walls extending upwardly into the filtering space from a bottom wall thereof and ending with an apex are provided inside the device. One or more second walls downwardly extending into the filtering space from a top wall thereof are also provided. Each of the walls defines a closed path. The first and second walls jointly cause the liquid to flow in a curvilinear flow path from the inlet to the outlet. Apexes of the first walls may be defined such that each apex more distal along the liquid flow path is at a lower level than an apex of a first wall more proximal along the flow path. One or more venting ports may be formed at a top wall portion of the housing for releasing gas from the filter.

28 Claims, 7 Drawing Sheets

(56) References Cited

U.S. PATENT DOCUMENTS

| | | | |
|---|---|---|---|
| 2,369,915 A | | 2/1945 | Quinn |
| 2,413,375 A | * | 12/1946 | Pomeroy .................. 210/206 |
| 6,454,941 B1 | | 9/2002 | Cutler et al. |
| 6,926,828 B2 | * | 8/2005 | Shiraishi et al. .............. 210/310 |
| 7,441,665 B2 | | 10/2008 | Bridges et al. |
| 2002/0092813 A1 | | 7/2002 | Radford |
| 2005/0011824 A1 | | 1/2005 | Vetterli |

FOREIGN PATENT DOCUMENTS

| | | |
|---|---|---|
| WO | 2004052789 A2 | 6/2004 |
| WO | WO 2004/071961 A2 | 8/2004 |
| WO | WO 2005/092798 A1 | 10/2005 |
| WO | 2006003353 A1 | 1/2006 |

\* cited by examiner

GRAVITATIONAL FILTER AND LIQUID PURIFICATION DEVICE

CROSS-REFERENCE

This is a National Phase Application filed under 35 U.S.C. 371 as a national stage of PCT/IL2007/001066, with the filing date of Aug. 28, 2007, an application claiming the benefit under 35 USC 119(e) U.S. Provisional Patent Application No.: 60/823,664, filed on Aug. 28, 2006, and is also an application claiming the benefit under 35 USC 119(e) U.S. Provisional Patent Application No. 60/929,668, filed on Jul. 9, 2007, the entire content of which is hereby incorporated by reference in its entirety.

FIELD OF THE INVENTION

The present invention concerns methods, devices and system for purifying liquid, particularly water.

BACKGROUND OF THE INVENTION

Filtering devices and methods for filtering liquids, particularly such for filtering water to obtain potable water, are known. Examples are U.S. Pat. Nos. 789,968 and 1,090,283. Such filtering devices generally hold a filtering medium with reactants that can remove harmful or otherwise undesired substances from the filtered water.

WO 2004/071961 discloses a water treatment device and method for treating water. The device includes a water-collecting chamber and a filtration chamber which includes a set of reactants that include a polycation, a polyanion and optionally other components. The filter includes upwardly extending and downward extending circular walls intercalated into the spaces between one another. The water flows through the filter by gravitational force. Another water-filtering device and method is disclosed in WO 2005/092798.

SUMMARY OF THE INVENTION

In accordance with the invention a novel purifying system is provided, for filtering liquid under gravitational flow, to be referred herein occasionally also as "liquid filter" or "filter". In accordance with a preferred embodiment of the invention the liquid is water.

The invention provides a liquid purifying system for filtering a liquid from a source or reservoir into a purified liquid receptacle. In accordance with a preferred, albeit non-exclusive application, the system of the invention is applied for gravitationally filtering and purifying a liquid from a source or reservoir above the filter into a purified liquid receptacle below the filter The filter comprises a housing with a top and a bottom that contains a generally horizontally oriented filtering space that holds a liquid treatment medium.

It should be note that the terms "top", "bottom", "horizontal" or "horizontally oriented" are given for convenience only for providing a frame of reference to describe relative position and orientation of the filter's components. During filtering of liquid in accordance with one of the embodiments of a filter for gravitational filtering, the "top" will face upwards, the "bottom" downwards. However, in other modes of use and/or other embodiments, the orientation may be different, e.g. in the case of a filter in accordance with the teaching herein fitted at the bottom of portable potable water container which has a "top" upwards orientation during filtering and a "bottom" upwards orientation during use.

The housing of the filter is provided with one or more liquid inlets at a top portion of the filter and one or more liquid outlets at a bottom portion of the filter. The one or more liquid inlets and one or more liquid outlets are configured such that the liquid flows in a generally lateral direction through the liquid treatment medium, e.g. in a general radial direction from the one or more inlets at a top peripheral portion of the housing to a bottom outlet at about the center of a bottom portion of the housing, or from an inlet at a central top portion of the housing to one or more peripheral outlets at a bottom peripheral portion of the housing. The term "generally lateral direction" means to denote the fact that the flow, which as will be noted below has a curvilinear flow path and by virtue of the fact that it is gravitational, has typically also a general downward trend, has a general horizontal trend that is more pronounced than the vertical one. Upwardly extending into the filtering space from a bottom wall thereof are one or more first walls and downwardly extending into the filtering space from a top wall thereof are one or more second walls. Each of these walls defines a closed path, the first and second walls being configured so as to jointly cause the liquid flowing in a generally lateral direction from the one or more inlets to the one or more outlets to flow to assume a generally curvilinear flow path. The one or more first or second walls serve as barriers that do not permit the water to flow in a linear path, but rather assume a curvilinear one. In some embodiments of the invention the walls are configured such that at least one of the first or the second walls extend into the space formed between two adjacent opposite second or first walls, respectively. In accordance with an embodiment of the teaching herein the apexes of the first walls are such that each apex more distal along the liquid flow path is at a lower level than an apex of a first wall more proximal along the flow path.

In accordance with one embodiment of the invention the liquid inlet(s) is at the filter's periphery and the outlet(s) is at a central portion of a bottom wall of the filter. In accordance with this embodiment the liquid flows from the periphery in a generally radial, overall descending curvilinear flow path to the filters central outlet(s). In accordance with another embodiment of the invention, the water inlet(s) is formed at a central part of the upper wall and the outlet(s) is defined at a bottom, peripheral portion of the filter. In accordance with this embodiment, the liquid flows in a generally radial, overall descending curvilinear flow path from the central water inlet(s) into the peripheral outlet(s).

In accordance with some preferred embodiments of the invention, the liquid inlet(s) and outlet(s) are arranged such that the liquid flows generally uniformly throughout the entire inner, filtering space of the filter, such that the entire filtering medium participates in the filtration process. For example, where the water inlet(s) is in the peripheral upper portion of the filter, the one or more water inlets are arranged so as to have a substantially uniform circumferential distribution in the filter's periphery. Similarly, where the water outlet is at a bottom peripheral portion of the filter, such one or more outlets are arranged so as to have a substantially uniform circumferential distribution at said periphery. For example, the water inlets may consists of a plurality of apertures equidistantly distributed along the periphery of the filter's top portion; may consist of a number (e.g. 2, 3, 4, 5, 6 or 8) of elongated, arced openings along the periphery of the filter's top portion.

In accordance with one embodiment of the invention, the first and second walls are concentric, typically coaxial and essentially parallel to the filter's vertical axis. By an embodiment of the invention each of the first and second walls are circular.

Provided by the invention is also a liquid filter having a housing of a kind specified above and that comprises one or more venting ports formed at a top portion of the housing. Where the filter is of a kind having internal walls as specified, the venting ports are typically ports that open into space peripheral to a most peripheral second wall. Such ports vent air which may be entrapped within the filtering space which if not released, may impair the continuous filtering process. The venting ports are typically formed at level that is higher than the level of the liquid inlets. In accordance with an embodiment of the invention the liquid inlet and the venting ports are linked by a wall portion that is sloped and ascends from said inlet to said port.

The system of the invention for the purpose of purifying water is particularly a device intended to yield potable water. In this case, the device may comprise a filter medium with reactants as known per se, for example those described in WO 2004/071961 and WO 2005/092798.

In accordance with an embodiment of the invention the liquid treatment medium may comprise components that release a beneficial substance to the potable water. Such a substance may be of a nutritional or health value or may have a water disinfecting activity. A specific example of such a substance is iodine.

By one embodiment of the invention, the purifying device comprises a porous substrate, typically disposed above the inlet of the filter, that release said beneficial substance into the water. For example, such substrate may be in the form of a mesh net, porous or fibrous material, etc. The water thus comes into contact with said substrate prior to egress to the filter space through said inlet. In accordance with one embodiment, provided is also a sorbing substrate for sorbing substance that may be released from said porous substrate into a source water reservoir. Such a sorbing substrate is typically disposed above the substance-releasing porous substrate and may, in the case of iodine, be activated carbon, porous or fibrous material, etc.

In accordance with an embodiment of the invention, the filtering space has a flow-delay chamber disposed in the flow path between the liquid inlet and the filtering space. The flow-delay chamber may include a flow bather in the form of one or more of a net, mesh, porous material, fibrous material or the like, or any combination thereof, within the chamber or at one or both ends thereof.

Provided by the invention is also a purifying system for filtering and purifying water into potable water, having a housing of a kind specified above and comprising a polymeric substrate incorporating iodine and being capable of releasing it into the source water. Polymers that incorporate and can release iodine into a surrounding aqueous medium are generally known. Examples are polyamides such as Nylon 6, Nylon 6,6, Nylon 11 and natural proteins, polyurethanes made from diisocyanates and diols for example: segmented polymers made from toluene diisocyanate and short chain poly(ethylene glycol), polybutylene glycol and polycaprolactone, polyurea, polyvinyl pyrrolidone, polyethylene imine, polyvinyl amine, chirosan, poly(vinyl pyridine) and other polymers and copolymers bearing amide and amine and urethane groups. Iodine may be included in such a polymer in an electrostatic and coordination complex form of neutral iodine ($I_2$) or iodide anion ($I_3^-$) with the amide, amine or urethane bonds where such a complex can reach 50% w/w of the carrier weight. Iodine is gradually released by solubilization to the water as a function of contact time, temperature, and iodine complexation process in the carrier.

Typically, a purifying system that includes an iodine-releasing polymer, also includes a component for subsequent absorption of iodine from the water. Such component is typically included in the filtering medium inside the filtering space.

Also provided by the invention is a filter for filtering water into potable water, having a housing of a kind specified above and comprising a ceramic filtering device fitted for contact with the filtered water, typically at the water outlet(s) for absorption of heavy metals from the water.

In accordance with some embodiments of the invention the purifying system is configured for use in association with a portable potable water container. Such a container typically comprises a potable water reservoir with a sealable dispensing outlet; a purifying system as disclosed herein fitted at the base of the container such that outlet from the filter opens into the reservoir; and a water receptacle for receiving source water and feeding it into the liquid inlet. The container has a filtering position in which the container is inverted with its base being outwardly oriented for filtering of source water into potable water which is accumulated in the reservoir.

By an embodiment of the portable potable water container of the invention, the water receptacle is fitted on the top side of the filter and has a collapsed state in which it is compacted adjacent said top side and an extended state. For filtering of source water the receptacle is opened to the extended state. Typically, the potable water container according to this embodiment comprises a filter cover for fitting over the receptacle when in its collapsed state. Said cover then serves also as a base for said container. The fitting of the filter cover may be a screw-type fitting or any other convenient fitting mechanism.

In accordance with one embodiment of the invention, the filter comprises an integral vent for venting the potable water reservoir. Said vent has at least one first opening that opens into the potable water reservoir and at least one second opening that opens to the exterior. In an embodiment of the invention where the filter is integrated with a portable potable water container, the at least one second outlet is typically sealable, e.g. by a O-ring that is compressed by the filter cover.

The invention also provides, by another aspect, a method for filtering and purifying source liquid, comprising inducing the liquid to flow through a filter medium generally lateral overall descending curvilinear flow path.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 7A and 7B show a section perspective view through a filter in accordance with another embodiment of the invention, embodying an integral vent for venting a potable water reservoir, wherein FIG. 7A shows a vent in a sealed state and FIG. 7B in an open venting state.

DETAILED DESCRIPTION OF EXEMPLARY EMBODIMENTS

In the following description a specific embodiment of the invention for filtering and purifying source water into potable water will be described. It should be appreciated that the invention is not limited to this embodiment and the filter of the invention may be used for filtering and purifying any other liquid.

Figure 1:
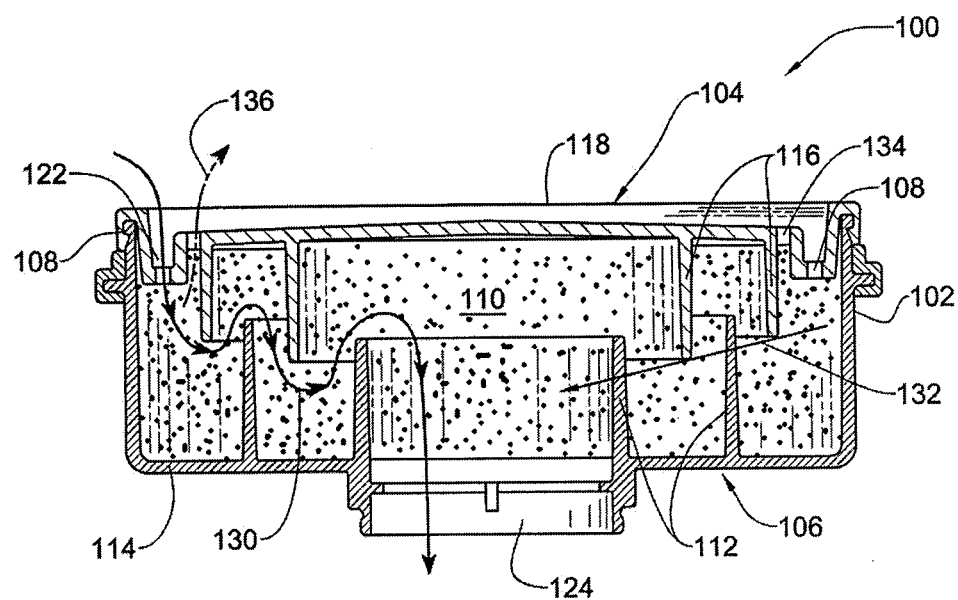
FIG. 1 is a cross-sectional view of a filter in accordance with an embodiment of the invention.

Reference is first being made to FIG. 1 showing a filter device generally designated 100 including a casing 102 which, in this specific embodiment, is formed from an upper filter member 104 and a lower filter member 106 fitted together in a snap-type arrangement by means of peripheral snap and corresponding groove 108. The two filter members jointly define a filtration space 110. In use, filtration space 110 is filled with a filtration medium, which may comprise, as known per se, components such as resins, active carbon, etc., intended to remove nauseous or otherwise undesired substances from the medium. The constituents of the filter medium may be dictated by the quality of the source water, the desired quality of the potable water, and generally may be designed to meet acceptable or regulatory standards. Considerations for devising proper filter constituents are known per se.

The filter is designed for filtering water from a source above the filter into a potable water receptacle which may be placed below the filter. The filter comprises a series, two in this specific embodiment, of a first set of walls 112 which upwardly extend from the bottom wall 114 and a set of second walls 116 downwardly extending from the upper wall 118 of the filter. All the walls in this specific embodiment define a circular path, all the walls being parallel and coaxial. One or more water inlets 122 are formed in the peripheral upper portion and are typically arranged so as to permit relatively uniform water inlets throughout the entire periphery of the filter. This may be achieved by a plurality of openings equidistantly spaced in a circular array; or alternatively this may be achieved by one or a few annular openings in the top portion.

The filter has a water outlet 124 at the central bottom portion thereof.

First walls 112 and second walls 116 are interlaced in a dovetailing manner such that one or more second walls are fitted into spaces between two adjacent first walls and vice versa. Thus, a generally lateral, overall descending, curvilinear flow path is defined between water inlet(s) 122 and water outlet 124.

The first walls 112 have apexes such that each apex more distal along the flow path is at a lower level than the apex of a first wall more proximal in the flow path. This is an important characteristic to ensure relatively high throughput water filtering under gravitational force. The water flows through the filter in a curvilinear flow path represented by wavy arrow 130. The water flows in a generally radial direction from inlets 122 to outlet 124. The water flow through the filtration space 110, at least through its main portion, has a generally lateral orientation with a slight downward trend, as represented by arrow 132.

The filter also includes one or more venting ports 134 for release of air which may be entrapped within the filter, as represented by dashed arrow 136. The venting ports are typically in the form of elongated circumferential openings or a plurality of ports equidistantly spaced in a circular array.

Figure 2:
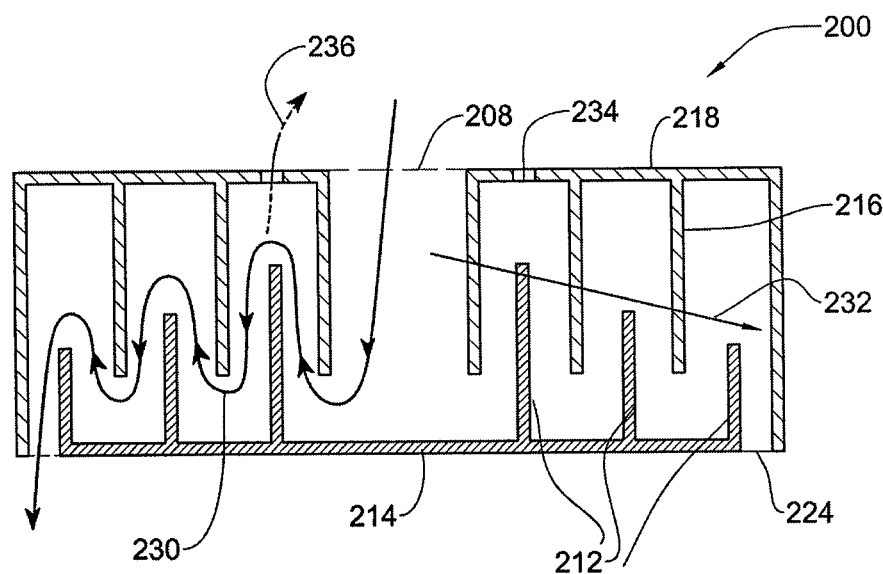
FIG. 2 is a cross-sectional view of a filter in accordance with another embodiment of the invention.

Another embodiment of a filter 200 is shown in FIG. 2. In FIG. 2 functionally similar elements to those of FIG. 1 have been given like reference numerals shifted by 100. Filter 200 includes a central water inlet 208 formed in the upper wall 218 and has one or more peripheral outlet(s) 224 in the peripheral part of bottom wall 214. In this embodiment a generally lateral, overall descending, curvilinear flow path represented by arrow 230 is defined between inlet 208 and outlet(s) 224. The general lateral and slightly downwardly trended path is represented by arrow 232. The apexes of first walls 212 are allocated at a gradual decreasing level along the flow path, which in this embodiment is defined between the center to the periphery.

Figure 3:
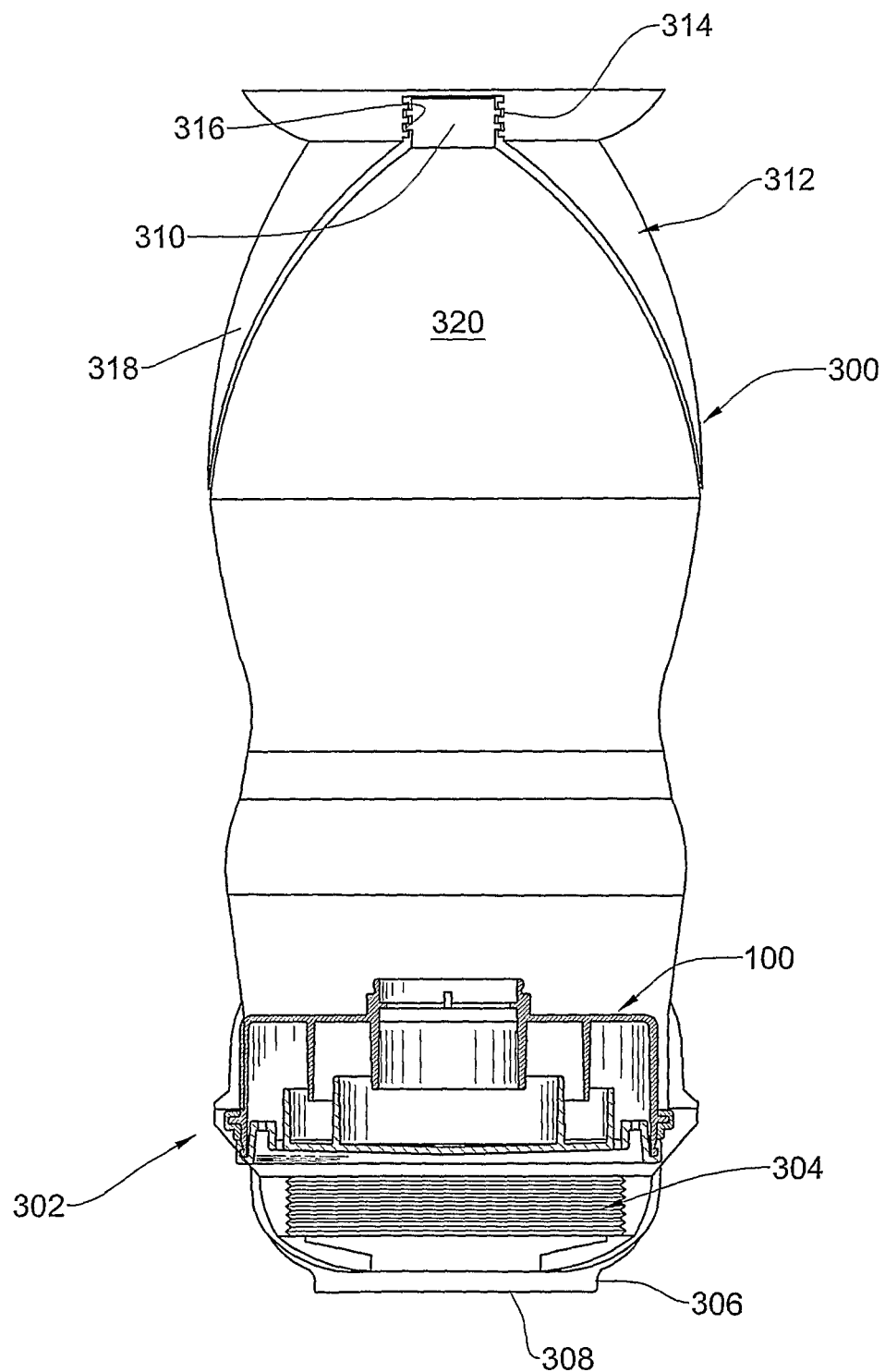
FIG. 3 is a partial cross-sectional view showing the filter of FIG. 1 fitted on a portable potable water container in conjunction with a source water receptacle, in a state in which the source water receptacle is retracted and overlaid with a filter cover.

Reference is now being made to FIG. 3 showing a filter 100, similar to that shown in FIG. 1, incorporated into a portable potable water container 300. Filter 100 forms part of a filtering assembly 302 including, in addition to filter 100, a water receptacle 304, shown in a collapsed state, and a filter closure 306 fitted over the collapsed water receptacle 304, typically in a screw-type engagement. Filter closure 306 has a flat bottom 308 which in the state shown in FIG. 3 can serve as a supporting base for the container 300. At the opposite end, potable container 300 has a dispensing outlet 310 sealed with a closure member 312 having a space 314 fitting over the neck 316 of dispensing opening 310 and adapted to engage and seal the opening, typically in a screw-type manner. The closure member 312 has side portions 318 which envelope the upper part 320 of the bottle. This closure member 312 is fitted to support the bottle when inverted for the purpose of filtering water as will be explained below.

Figure 4:
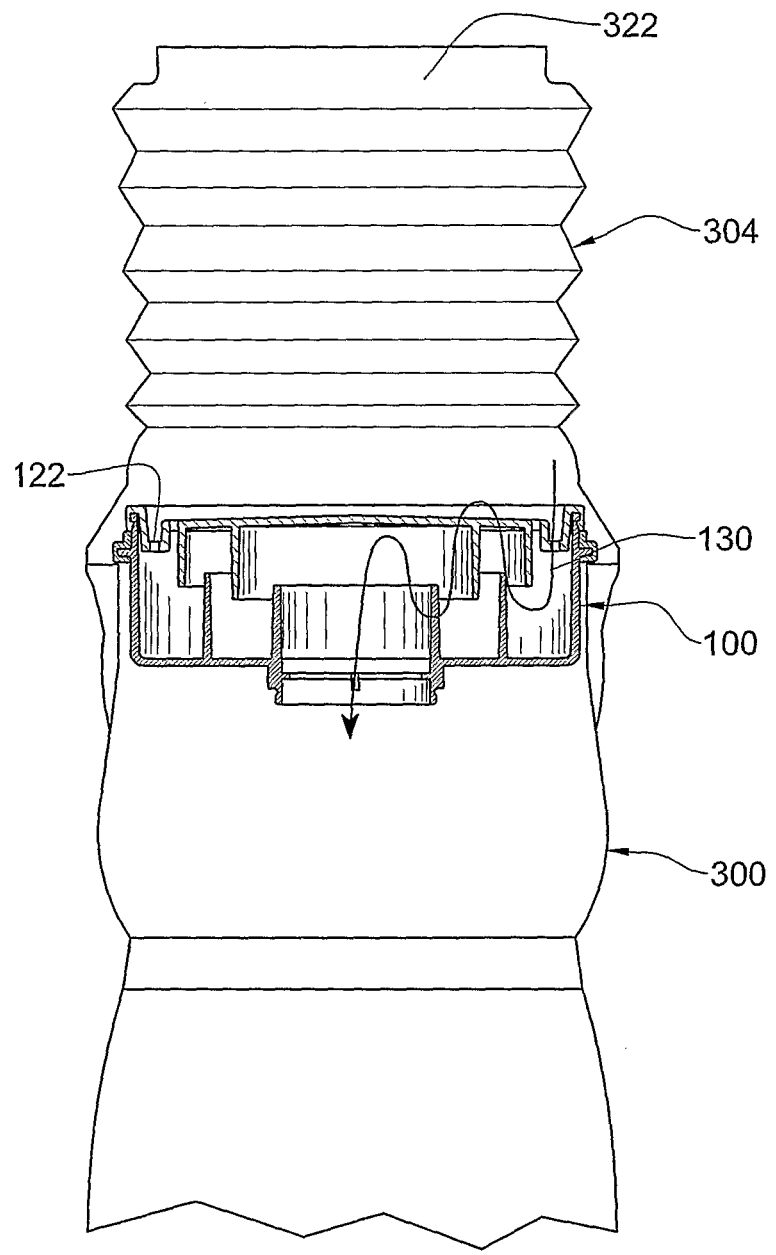
FIG. 4 shows the potable water container of FIG. 3, with the source water receptacle in an extended state.

Reference is now being made to FIG. 4 showing the bottom portion of container 300 in an inverted manner with the filter 100 on top and with the source water receptacle 304, which as can be seen in this figure has a bellows-type configuration, being extended into a fully open position defining an internal receptacle space 322 which can receive source water to be filtered and purified by filter 100. As can be seen, water inlet(s) 122 are in flow communication with the receptacle space whereby water introduced into the receptacle space can pass through the filter, as represented by arrow 130, into the potable container. Following such filtration, receptacle 304 can be collapsed, and the filter cover 308 can then be put in place into the state as shown in FIG. 3.

Figure 5:
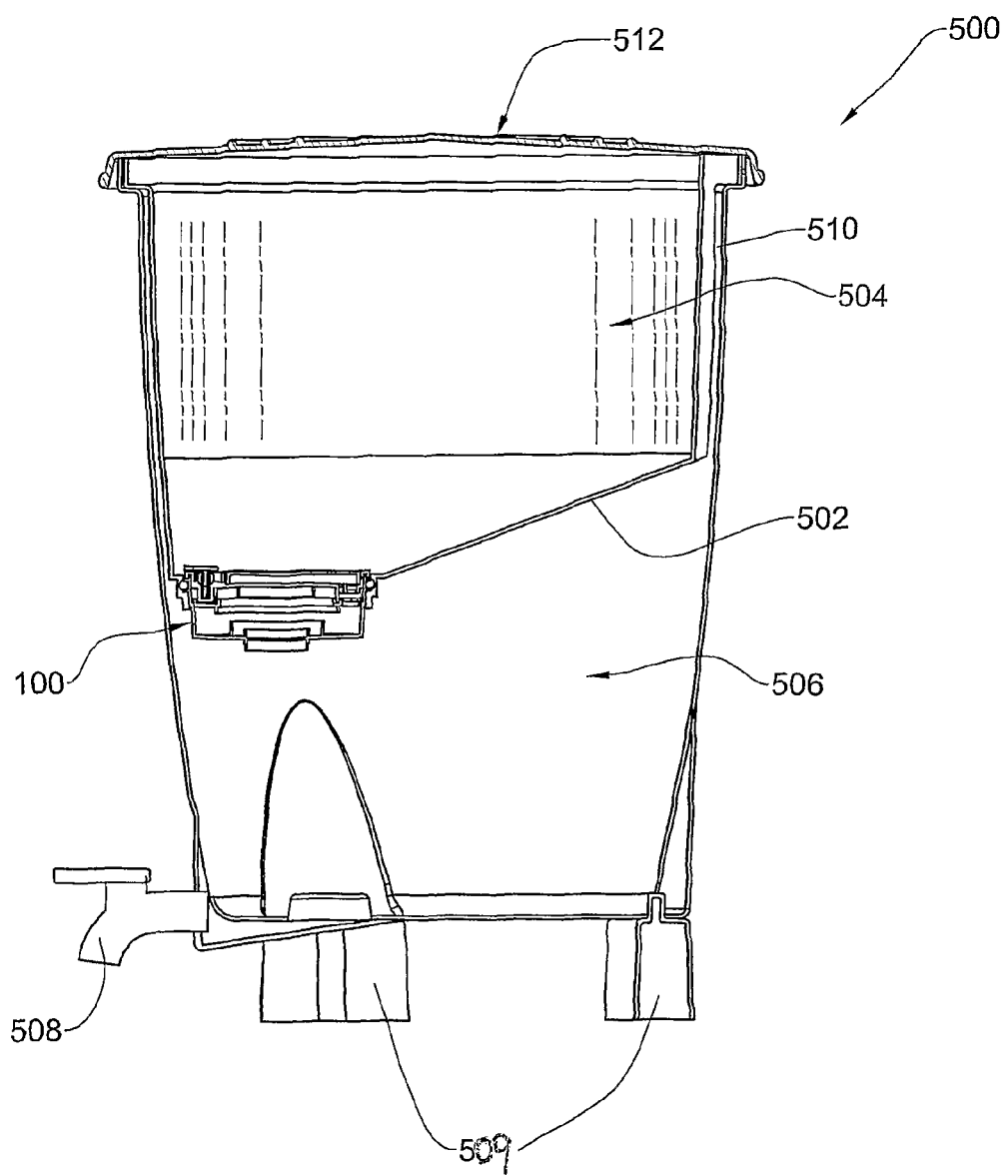
FIG. 5 shows a filter in accordance with an embodiment of the invention incorporated in a table water filtration device.

FIG. 5 shows a filter of the kind of filter 100 shown in FIG. 1, incorporated into a tabletop water filtration device 500. Device 500 is partitioned by a partition 502 into a source water receptacle 504 and a potable water reservoir 506 having a dispensing valve outlet 508. Device 500 is fitted with support legs 509. A vent 510 extends into the potable water reservoir 506 along a side wall of device 500 and permits the release of air while water is filtered into reservoir 506.

Source water receptacle 504 is covered by a cover 512 and when lifted, source water can be filled into receptacle 504 and can then be filtered through filter 100, in a manner shown and described before, into potable water reservoir 506 for subsequent use.

Figure 6A:
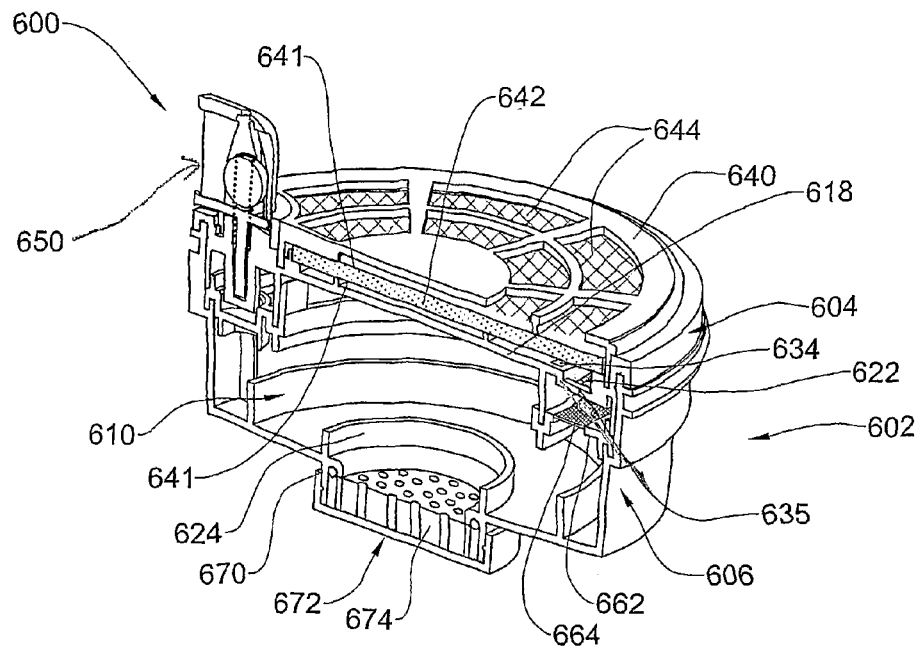
FIG. 6A and FIG. 6B are, respectively, section perspective view and a cross-sectional view, of a filter in accordance with another embodiment of the invention.
Figure 6B:
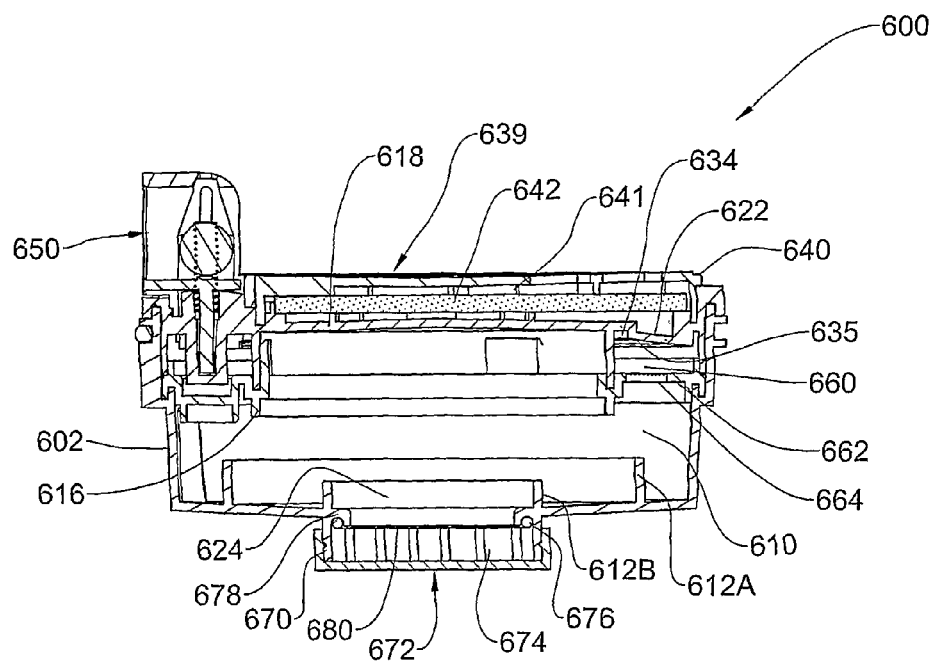

Reference is now being made to FIGS. 6A and 6B, showing a filter device 600 having a casing 602 which, in a similar manner to the filter of FIG. 1, is formed from two filter members including an upper filter member 604 and a lower filter member 606, which are typically welded together, and jointly define a filtering space 610. Filtering space 610 is filled, in use, with a filtration medium for filtering and removing toxic or otherwise harmful or undesirable substances from the water.

The filter device includes a pre-treatment arrangement 639 that includes a cover member 640, a water treatment chamber 641 defined between cover member 640 and the upper wall 618, holding a porous substrate 642 adapted to release iodine into the water. Porous substrate 642 may, for example, be in the form of a sponge which may be made out of polyurethane. The porous substrate has typically iodine sorbed therein and may be coated, for example by ethyl vinyl acetate coating, that is intended to provide some control of the release parameters and also to increase storage stability by inhibiting release of iodine during storage. The coating may, for example, be by spraying. The iodine has a disinfecting function in that it causes elimination of microorganisms from the water. Typically, the iodine will subsequently be absorbed by the filtration medium within filtering space 610. As can be seen, cover member 640 has a plurality of openings 644 that permit water egress, which are typically covered by a fine net that permits water egress, on the one hand, and serves a number of functions, on the other hand, including filtering out particulate material and maintaining integrity of the porous substrate 642 kept below it. Filter device 600 also includes a filter status gauging device 650, of the kind described in co-pending Patent Applications, Ser. Nos. 60/828,643 and 60/872,489, the contents of which are incorporated herein by reference.

Filter device 600 includes water inlets 622 in the form of annular openings throughout the periphery of the upper wall 618 to permit essentially uniform water inflow throughout the entire periphery of the filter. Annular openings 622 are also typically covered by a fine net. Filter device 600 also includes venting ports 634 for release of air-bubbles that may egress with the water. The venting ports 634 are formed at a level higher than the level of the water inlet 622 and are linked by a wall portion 635 that is sloped and ascending from the water inlet 622 to the venting ports 634.

Water inlets 622 open into a flow delay chamber 660, defined at its bottom by a wall portion 662 including a circumferential opening 664 that is typically covered by a net element. In some embodiments of the invention, chamber 660 may be filled by a flow-delaying substrate, which may be porous substrate, fibrous substrate, a sponge, etc. In other embodiments, the flow-delaying function is embodied in the net that covers opening 664. The flow delay chamber 660 functions to delay the water flow to allow time for the disinfecting action of iodine-releasing member 642.

Included within the filtering space 610 are a first set of walls 612A and 612B, which are circular and concentric with the more peripheral wall 612A having an apex, which is the higher elevation of the apex of wall 612B, which surrounds water outlet 624. The filtering space also includes a downwardly extending second wall 616, the first and second walls jointly cause the water to assume a generally lateral albeit curvilinear flow path through the filter medium.

Fitted on circular wall 670, downwardly extending from the bottom of the filter device 600, around opening 624, is a cap 672 that holds a ceramic filtering member 674 which, in accordance with a specific embodiment of the invention, is designed to filter out and thus remove metals, e.g. arsenic from the water. The filtering member 674 is porous, thus permitting water-flow therethrough. The bottom of cap 672 has large openings typically covered by a net to permit water flow therethrough. As can be seen, member 674 is pressed by cap 672 against O-rings 676, accommodated in groove 678, which provides a water-tight seal ensuring that water flows entirely through member 674. Opening 624 is also typically covered by a net 680.

Figure 7A:
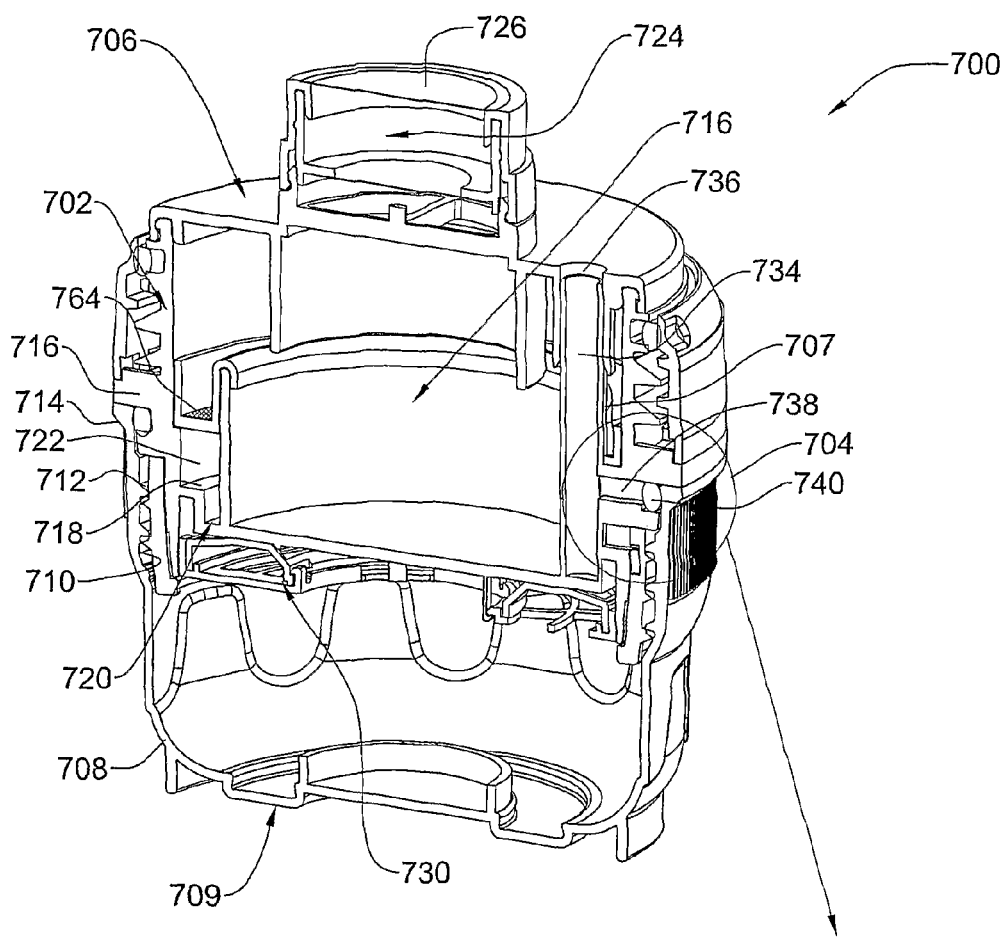
Figure 7C:
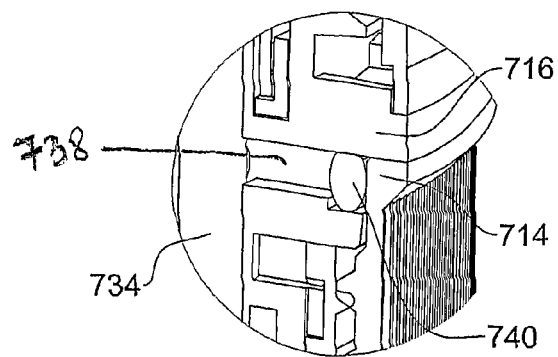
FIGS. 7C and 7D show a two-fold enlargement of the circled portion of FIGS. 7A and 7B, respectively.
Figure 7B:
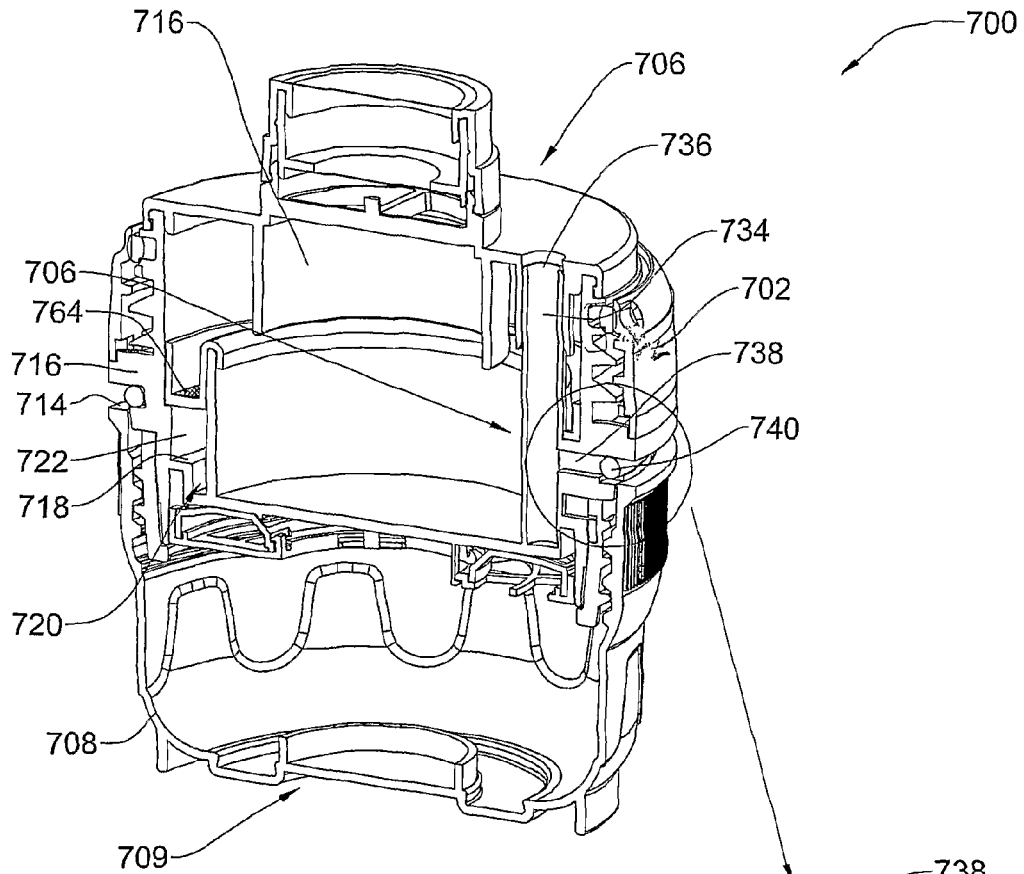

Reference is now being made to FIGS. 7A-7D, which show a filter device 700 according to another embodiment of the invention. Filter 700 has a filter body 702 incorporating an integral venting arrangement 704 for venting a potable water reservoir (not shown) that is fitted to top face 706 of filter 700 (the face 706 is a top face in the state as shown herein; and becomes the bottom face of the filter when inverted during filtration). The filter includes a filter cover 708, functionally similar to that of the filter shown in FIGS. 3-4 that has a bottom face 709 on which the bottle (not shown in FIGS. 7A and 7B) can be made to stand when in its regular use mode (namely other than when filling water). The filter cover 708 has inward-facing threading 710 that engages with an outward-facing threading 712 on body 702, and thus through turning can switch from a fully engaged or closed state, shown in FIG. 7A, in which the upper rim 714 of cover 708 is tightly fitted against shoulder 716 and a partially opened state, as shown in FIG. 7C and a fully opened state (not shown) for filtering water. The filter cover 708 can accommodate a folded water receptacle (not shown in FIGS. 7A and 7B) in a manner similar to that of the embodiment shown in FIGS. 3 and 4.

Defined in filter body 702 is a filtering space 716 and included are water inlets 718, venting ports 720, flow delay chamber 722, and a water outlet 724 fitted with a cap 726 that can hold a ceramic filtering member with a function similar to that of member 674 in FIGS. 6A and 6B. A pre-treatment arrangement 730 is provided having a similar function to pre-treatment arrangement 639 in FIGS. 6A and 6B.

Figure 7D:
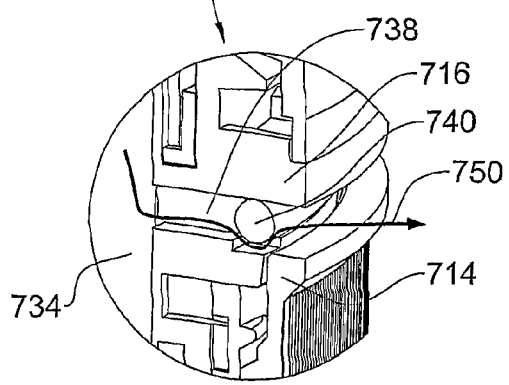

Venting arrangement 707 has a main venting channel 734 with a first opening 736 that opens into the potable water reservoir (not shown) and a second opening 738 that can open to the exterior, as can best be seen in FIGS. 7C and 7D. An O-ring 740 has dual functions. On the one hand it serves to ensure a fluid-tight seal between the cover 708 and body 702 when in the closed state. On the other hand it serves a valve for second opening 738. In the closed state O-ring 740 is compressed and seals opening 738, as can be best seen in FIG. 7C. When the cover is opened the O-ring 740 is relaxed and assumes a circular cross-sectional shape that permits air outflow, as represented by arrow 750 in FIG. 7D, as a result of filling of the water reservoir with filtered, potable water.

The invention claimed is:

1. A liquid filter for gravitationally filtering a liquid from a reservoir above the filter into a filtered liquid receptacle below the filter, the filter comprising:
   a housing having a top and a bottom, the housing containing a generally horizontal filtering space holding a liquid treatment medium, and comprising one or more liquid inlets at a top portion of the filter and one or more liquid outlets at a bottom portion of the filter configured to cause the liquid to flow in a generally lateral direction through the liquid treatment medium; and
   two or more first walls upwardly extending into the filtering space from a bottom wall thereof and each ending with an apex and one or more second walls downwardly extending into the filtering space from a top wall thereof, each of the walls defining a closed path, the first and second walls cause the liquid to flow in a curvilinear flow path from the inlet to the outlet, the apexes of the first walls are such that each apex more distal along the liquid flow path is at a lower level than an apex of a first wall more proximal along the flow path.

2. The filter according to claim 1, wherein at least one of the first or second walls extends into a space formed between two adjacent opposite second or first walls, respectively.

3. The filter according to claim 1, wherein the one or more liquid inlets are located at a central part of the top side of the housing and the one or more liquid outlets are located at a periphery of the bottom side of the housing.

4. The filter according to claim 1, wherein the one or more liquid inlets are located at a periphery of the top side of the housing and the one or more liquid outlets are located at a central part of the bottom side of the housing.

5. The filter according to claim 1, wherein the one or more outlets are located at a bottom wall portion of the housing within confines of an innermost first wall.

6. The filter according to claim 1, wherein the one or more liquid inlets comprise one or more inlet apertures at a periphery of the top side of the housing.

7. The filter according to claim 6, wherein the one or more inlet apertures are symmetrically distributed in the periphery of the top side of the housing to provide for uniform inlet flow.

8. The filter according to claim 1, wherein the first and second walls are concentric.

9. The filter according to claim 1, wherein the first and second walls are coaxial and essentially vertically oriented.

10. The liquid filter according to claim 1, comprising one or more venting ports formed at a top wall portion of the housing for releasing gas from within the filtering space.

11. The filter according to claim 1, wherein the liquid is water and the filter is configured for filtering source water into potable water.

12. The filter according to claim 11, comprising a component that releases a substance into the potable water, the substance having a nutritional or health value or having a water-disinfecting activity.

13. The filter according to claim 12, wherein the substance is iodine.

14. The filter according to claim 13, wherein the iodine is released into the potable water from a porous substrate.

15. The filter according to claim 14, comprising a sorbing substrate for sorbing substances that may be released from the porous substrate into a source water reservoir.

16. The filter according to claim 1, further comprising a flow-delay chamber disposed in the flow path between the liquid inlet and the generally horizontal filtering space.

17. The filter according to claim 16, wherein the flow delay chamber comprises a flow barrier within the chamber or at one or both ends thereof.

18. The filter according to claim 1, further comprising an integral vent for venting an associated potable water reservoir.

19. The filter according to claim 1, configured for use in association with a portable potable water container.

20. A potable water container comprising a liquid filter according to claim 1.

21. A potable water container, comprising:
   a potable water reservoir comprising a sealable dispensing outlet;
   a filter according to claim 19, fitted at a base of the container such that the water outlet opens into the potable water reservoir; and
   a water receptacle for introducing source water and feeding it to the liquid inlet;
   the container having a water filtering position in which the container is inverted with its base being upwardly oriented for filtering of source water into potable water which is accumulated in the reservoir.

22. The potable water container according to claim 21, further comprising a reservoir vent for venting the reservoir while filtering.

23. The potable water container according to claim 22, wherein the vent is integrally formed within the filter.

24. The potable water container according to claim 21, wherein the water receptacle is fitted to the top portion of the filter and has a collapsed state in which it is compacted adjacent to the top side and an extended state, and wherein the receptacle is opened to the extended state for introducing source water.

25. The potable water container according to claim 24, further comprising a filter cover for fitting over the receptacle in its collapsed state, the cover serving also as a base for the container.

26. The potable water container according to claim 25, wherein the fitting of the filter cover is a screw-type fitting.

27. The potable water container according to claim 25, further comprising a circumferential seal for ensuring a fluid-tight seal between the filter cover and the filter.

28. The potable water container according to claim 27, further comprising a reservoir vent for venting the reservoir while filtering which is integrally formed within the filter, the vent comprising one or more outside openings at an external side wall of the filter such that the opening is sealed by the seal upon fitting of the filter cover of the filter and is opened upon opening of the cover.

* * * * *

UNITED STATES PATENT AND TRADEMARK OFFICE
CERTIFICATE OF CORRECTION

PATENT NO. : 8,623,206 B2  Page 1 of 1
APPLICATION NO. : 12/310626
DATED : January 7, 2014
INVENTOR(S) : Wilder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1338 days.

Signed and Sealed this
Twenty-second Day of September, 2015

Michelle K. Lee
*Director of the United States Patent and Trademark Office*